US006792481B2

(12) United States Patent
Hoang et al.

(10) Patent No.: US 6,792,481 B2
(45) Date of Patent: Sep. 14, 2004

(54) DMA CONTROLLER

(75) Inventors: Minh Hoang, Stoughton, MA (US); Rajat Mitra, North Attleboro, MA (US)

(73) Assignee: Freescale Semiconductor, Inc., Austin, TX (US)

( * ) Notice: Subject to any disclaimer, the term of this patent is extended or adjusted under 35 U.S.C. 154(b) by 121 days.

(21) Appl. No.: 10/159,632

(22) Filed: May 30, 2002

(65) Prior Publication Data

US 2003/0225949 A1 Dec. 4, 2003

(51) Int. Cl.[7] .................................................. G06F 13/28
(52) U.S. Cl. .............................. 710/25; 710/29; 710/52
(58) Field of Search .......................... 710/22–28, 52–54

(56) References Cited

U.S. PATENT DOCUMENTS 5,247,671 A * 9/1993 Adkins et al. .............. 709/103
5,648,778 A * 7/1997 Linz et al. .................. 341/110
5,799,064 A * 8/1998 Sridhar et al. ........... 379/93.06
5,878,217 A * 3/1999 Cherukuri ................... 709/212
6,263,410 B1 * 7/2001 Kao et al. ................... 711/156
6,279,119 B1 * 8/2001 Bissett et al. ................. 714/12
2001/0016883 A1 * 8/2001 Mino .......................... 710/27
2001/0056353 A1 12/2001 Li et al.

* cited by examiner

*Primary Examiner*—Fritz Fleming
*Assistant Examiner*—Alan Chen
(74) *Attorney, Agent, or Firm*—James I. Clingan, Jr.; Daniel D. Hill

(57) ABSTRACT

A DMA controller has both a receiving portion and a sending portion and may be used in a modem or other data transmission context. The DMA controller is intended to provide to or receive from data samples on a bus that may or may not be available. For the case when the bus is available, samples of data are either sent to or received from proper memory locations. When the bus is not available, the number of the samples that are missed due to the bus not being available is stored. This count is then used to ensure that the samples that are provided or received when the bus becomes available are stored in or read from the proper location to provide the samples at the proper time. The locations in which the samples were lost are provided with predetermined values.

18 Claims, 2 Drawing Sheets

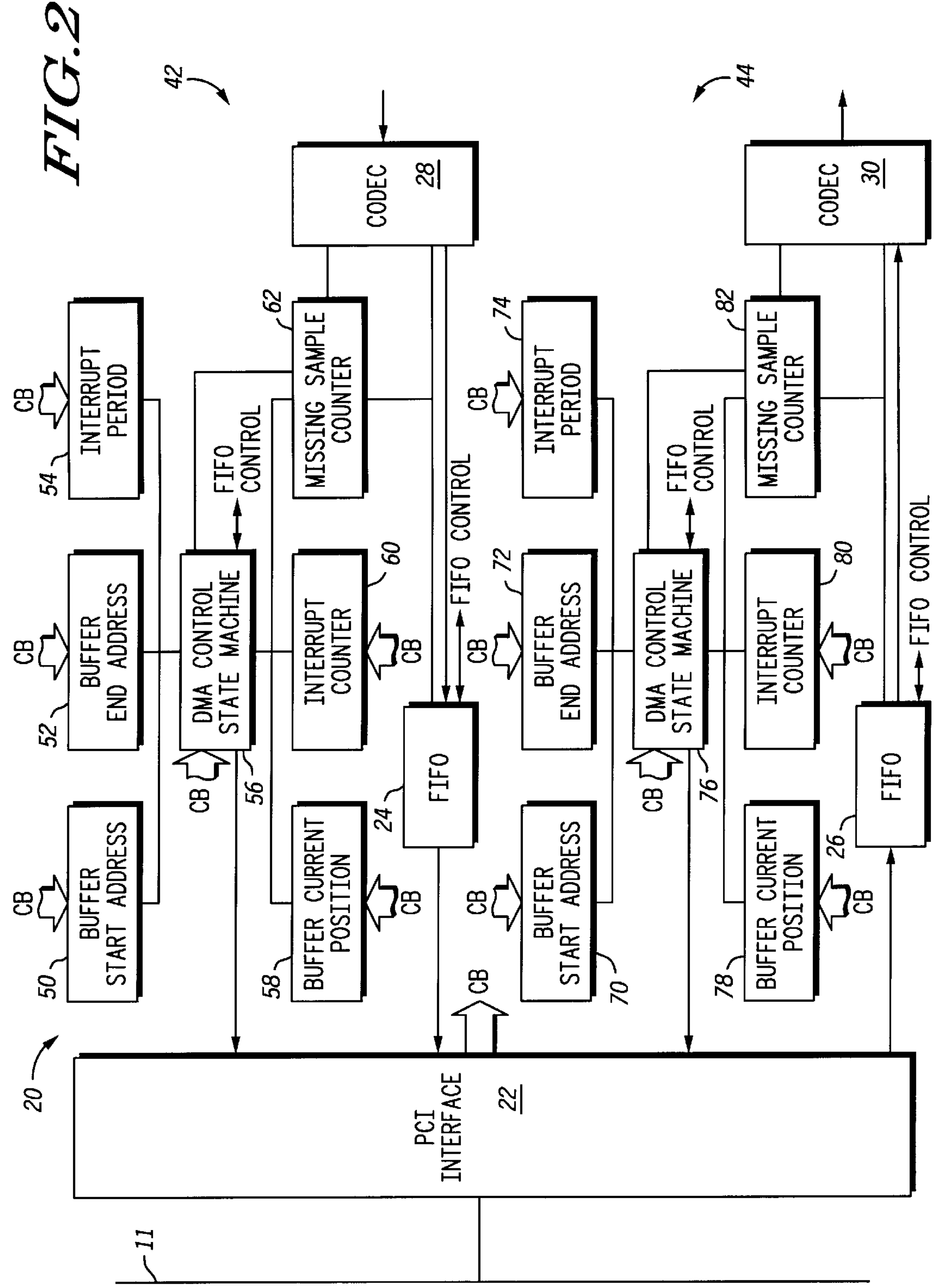
FIG. 2
20
42
44
CODEC 28
CODEC 30
CB
BUFFER START ADDRESS
50
BUFFER END ADDRESS
52
INTERRUPT PERIOD
54
DMA CONTROL STATE MACHINE
56
FIFO CONTROL
BUFFER CURRENT POSITION
58
INTERRUPT COUNTER
60
MISSING SAMPLE COUNTER
62
FIFO
24
FIFO CONTROL
BUFFER START ADDRESS
70
BUFFER END ADDRESS
72
INTERRUPT PERIOD
74
DMA CONTROL STATE MACHINE
76
FIFO CONTROL
BUFFER CURRENT POSITION
78
INTERRUPT COUNTER
80
MISSING SAMPLE COUNTER
82
FIFO
26
FIFO CONTROL
PCI INTERFACE 22
11

DMA CONTROLLER

FIELD OF THE INVENTION

This invention relates to DMA controllers and more particularly to DMA controllers used in controlling real-time data flow to analog signal acquisition and/or generation circuitry.

RELATED ART

Data systems confront a variety of issues relating to data transfer in and out of memories including situations in which data may be lost. This is commonly handled by a direct memory access (DMA) controller. The data loss may occur in the situation in which the data needs to be correlated with other data. This may occur in an audio and video situation in which the audio needs to be timed properly with the video. In some of these situations the loss of the data may not be critical to the utility of the particular transmission that is occurring. It may degrade, in part, the value but perhaps only slightly depending upon the level of degradation. For example in a movie that is being transmitted as video and audio signals, a short term loss of the audio or video may have minimal or perhaps no effect on the enjoyment of the viewer. In many current systems a data loss may result in a required restart in order to reset timings and provide for the data in proper correlation. This can be a noticeably disruptive process.

Thus, there is a need for a DMA controller that reduces the need for restarting.

BRIEF DESCRIPTION OF THE DRAWINGS

FIG. 2 is a block diagram of the DMA controller of FIG. 1 in more detail.

DETAILED DESCRIPTION OF THE DRAWINGS

Figure 1:
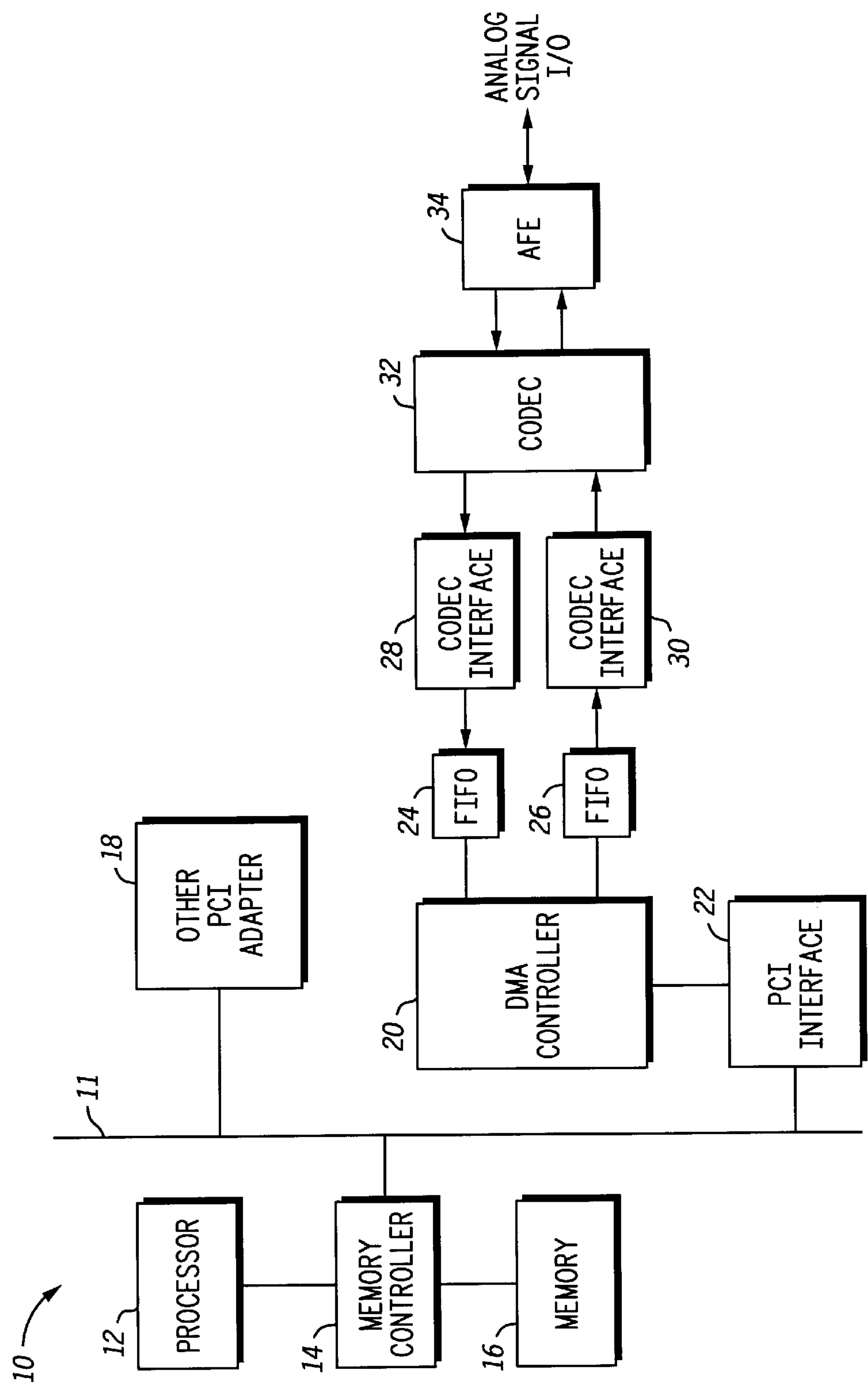
FIG. 1 is a block diagram of a system having a DMA controller according to a preferred embodiment of the invention.

A system has a direct memory access (DMA) controller that either provides data to a system memory or receives data from the system memory. This data may represent data appropriate for being received by or sent by a modem. There are situations in which the bus that provides communication between the memory and the DMA controller is occupied by another transaction so that data transmission between the DMA controller and the memory is blocked. The data may represent an audio signal or a video signal or some other signal that is appropriate for a modem in cases in which the timing of the signal is important in relation to the signals previously sent or other signals. The location in main memory provides this information with respect to timing. For example, with an audio signal at 8 KHz sampling rate, the consecutive memory locations of the digital samples have an implicit 125 microsecond spacing. The case being addressed, however, is where the DMA controller is attempting to load the memory through a bus, such as a PCI bus, but the bus is not available, and data is still being received by the DMA controller for loading. If the FIFO is not large enough to contain all of this incoming information, this information will be lost. Typically this would result in a signal indicating that communication to the DMA controller has been terminated and any data transmissions must be started over. In the case of a modem, this requires a full retrain which is a resynchronization procedure between the local and remote modems. Instead, the number of lost data samples are counted and, when the bus becomes available again, the DMA controller takes into account the number of missed samples and adjusts its address register so that the follow-on samples are stored in the proper locations in memory. That is in this example, the count of the missed samples is utilized by the DMA controller to achieve the desired result of the samples continually being placed in memory at the proper locations. The locations in main memory for which data has been lost are written with a predetermined input. This may be all zeroes, for example, or the previous value as another alternative. With the address adjustment based on the amount of missed samples, sampling time correlation with memory buffer address is maintained and the DMA controller no longer needs to be resynchronized but can continue to load samples into memory. The invention may be better understood by reference to the following description of the figures.

Shown in FIG. 1 is a system 10 comprising a bus 11, a processor 12, a memory controller 14, a memory 16, an other peripheral components interconnect (PCI) adapter 18, a DMA controller 20, a PCI interface 22, a FIFO 24, a FIFO 26, a CODEC interface 28, a CODEC interface 30, a CODEC 32, and an analog front end (AFE) 34 coupled to an external analog signal I/O. In this system 10 the bus 11 is a PCI bus that is commonly used in many computers. The other PCI adapter is shown as an example of any type of PCI adapter that may be coupled to a PCI bus such as a UART serial data interface, a smart card interface, a P1394 interface, a flat panel controller, a local area network interface, and any other peripheral. The PCI interface 22, DMA controller 20, FIFO 24, FIFO 26, CODEC interfaces 28 and 30, CODEC 32, and AFE 34 also constitute a PCI adapter for use as a modem. Processor 12, memory controller 14, and memory 16 together with the modem card form a modem. An analog signal is received or generated at AFE 34. This is useful as a dial-up modem, a speakerphone, or a DSL modem.

In normal operation for the case where an analog signal is to be provided to memory 16, AFE 34 provides the signal to CODEC 32, which converts the analog signal to a digital signal. CODEC interface 28 couples that signal that has been digitized to FIFO 24, which in turn couples the signal to DMA controller 20. DMA controller 20 then provides the signal to PCI interface 22 which couples the digitized signal on to PCI bus 11 where memory controller 14 receives it and stores it in the proper location in memory 16. This data will generally come from CODEC 32 as a regular periodic data sample stream. The data samples are collected in FIFO 24 as a group of data samples that are provided on to PCI bus 11 in a burst. The magnitude of the time period between data bursts is a function of the type of modem that is being provided in conjunction with the size of FIFO 24. If it is a regular phone line modem, the time between data bursts is relatively large. If it is a digital subscriber loop (DSL) type modem, then the time between data bursts is significantly less although the time for data bursts is still significantly smaller than the time between data bursts. For example, a data burst may last 15 to 30 nanoseconds for as much as 64 bits of transmission. If one sample is 16 bits, then up to 4 samples worth can be transmitted in one cycle of the bus, which may be 64-bit wide and which may be operating at 66 MHz. FIFO 24 accumulates enough samples so that efficiency of each transmission is achieved. Thus it is not just one sample that is loaded on to the PCI bus 11 at a time, but is rather, in the case of 64 bits, 4 samples for the case where each sample is 16 bits. The time between data bursts may be, for example, 2 microseconds for the case in which the sampling rate is 2 MHz, and 4 samples are transferred per data burst.

For these relatively high sampling rates of 2 MHz, however, the other PCI adapter 18 may intrude and require use of bus 11 for a number of cycles of the modem operation. The data transmission path for the modem operation for writing into memory 16 is blocked while the other PCI adapter 18 is occupying bus 11. FIFO 24 can still be loaded until filled. Thus if the blockage is short enough, all the incoming samples may be loaded into the FIFO. After FIFO 24 is full, however, and bus 11 is still occupied so that the data transmission path is blocked, each additional new sample is lost. For this case in which the other PCI adapter 18 is occupying the bus, DMA controller 20 retains a count of each sample that is missed. Thus if, for example, the other PCI adapter 18 occupies bus 11 for 12 samples more than FIFO 24 can hold, then the count is 12. The 12 lost samples also represent changes in the location in memory 16. That is, each sample sent to bus 11 is intended to be stored in a particular memory location in memory 16. By keeping a count of the number of samples that are missed, DMA controller then knows where the next memory location is intended for receiving the next valid samples. Thus the samples that are received at the time that bus 11 is available are sent to bus 11 with the information necessary for those samples to be written in the proper location in memory 16.

Similarly, in normal operation, where the modem function is to output the analog signal and when there is sufficient space in FIFO 26 to hold a data packet, DMA controller 20 issues a memory read request to PCI interface 22, which couples the request to bus 11. So long as bus 11 is available, the read request is received by memory controller 14, which in turn outputs the data packet onto bus 11. The data packet is then coupled to PCI interface 22, onto DMA controller 20, and to FIFO 26. At the proper sample time, CODEC 32 retrieves a data sample from FIFO 26 via CODEC interface 30 and converts it into an analog signal. Analog front end 34 then receives that and sends it as an output on the analog I/O.

If bus 11 is occupied, the read request from DMA controller 20 is pended. CODEC 32 can still, however, retrieve valid samples until FIFO 26 becomes empty. While FIFO 26 is empty, it outputs a predetermined value such as all zeroes or the last valid value, and DMA controller 20 keeps count of the number of missed samples that were replaced by the predetermined value being sent to CODEC 32. When bus 11 becomes available again, DMA controller 20 checks the missed sample counter and adjusts the buffer address pointer accordingly so that the new valid samples are output to CODEC 32 at their correct sampling time. Thus, the analog signal output suffers only a temporary corruption and resumes with proper timing instead of a delayed timing after an extended bus blockage. This is extremely important in situations where timing correlation must be maintained such as in a speakerphone or data modem with echo cancellation.

Shown in FIG. 2 is DMA controller 20 of FIG. 1 in more detail. Also shown in FIG. 2 are FIFO 26, FIFO 24, bus 11, CODEC 28, and CODEC 30. DMA controller 20 has a receiving portion 42 and a sending portion 44. Receiving portion 42 comprises a buffer start address 50, a buffer end address 52, an interrupt period 54, a DMA control state machine 56, a buffer current position 58, an interrupt counter 60, and a missing sample counter 62. PCI interface 22 provides a control bus CB to buffer start address 50, buffer end address 52, interrupt period 54, DMA control state machine 56, buffer current position 58, and interrupt counter 60. DMA control state machine 56 is also coupled to buffer start address 50, buffer end address 52, interrupt period 54, buffer current position 58, interrupt counter 60, and missing sample counter 62. There are also control signals between missing sample counter 62 and CODEC 28, and control signals between FIFO 24 and CODEC 28. Similar to receiving portion 42, sending portion 44 comprises a buffer start address 70, a buffer end address 72, an interrupt period 74, a DMA control state machine 76, a buffer current position 78, an interrupt counter 80, and a missing sample counter 82. The control bus CB from the PCI interface 22 also is received by buffer start address 70, buffer end address 72, interrupt period 74, DMA control state machine 76, buffer current position 78, and interrupt counter 80. Missing sample counter 82 is coupled to CODEC 30 as is FIFO 26. DMA control state machine 76 is coupled to buffer start address 70, buffer end address 72, interrupt period 74, buffer current position 78, interrupt counter 80, and missing sample counter 82. There is also a FIFO control signal bus between DMA control state machine 76 and FIFO 26. There is also a similar FIFO control signal bus between DMA control state machine 56 and FIFO 24. DMA control state machine 56 and DMA control state machine 76 provide signals to bus 11 via PCI interface 22.

In this system, CODEC sample buffers are kept in main memory 16. The buffers operate in a circular manner. Buffer start addresses 50 and 70 and buffer end addresses 52 and 72 are set via control bus CB to the starting and ending addresses respectively of the sample buffers in memory 16. Upon initialization, the DMA control state machines 56 and 76 set buffer current positions 58 and 78 to the starting address in buffer start addresses 50 and 70. Buffer current positions 58 and 78 are updated on every successful transfer. When they reach the values in buffer end address 52 and 72, the DMA control state machines 56 and 76 restore them to the starting addresses in buffer start addresses 50 and 70.

Each receiving and sending portion 42 and 44 has its own interrupt generation capability that may be used to signal the associated software running on processor 12. The desired interrupt intervals are loaded into interrupt period registers 54 and 74. On completion of each successful DMA sample transfer, interrupt counters 60 and 80 are incremented. If the counts match the value set in the interrupt periods 54 and 74, then they are reset to zero to start counting the next periodic interval, and indications are sent to DMA control state machines 56 and 76, which then signal an interrupt request to bus 11 via PCI interface 22.

In normal operation of the receiving portion 42, samples of data in digital form are received from CODEC 28 and coupled to FIFO 24 per the CODEC sampling time. Upon detecting that FIFO 24 is not empty, DMA control state machine 56 requests a bus transaction via PCI interface 22. If bus 11 is available and the request is granted, DMA control state machine 56 initiates a transfer of data sample from FIFO 24 addressed to the memory location given by buffer current position 58. The transfer continues in a burst until FIFO 24 is empty. As described earlier, interrupt counter 60 is also updated to track and generate periodic interrupt.

If bus 11 is not available, the bus request is pended and additional samples from CODEC 28 are coupled into FIFO 24 until it is full. If the bus blockage continues, missing sample counter 62 will be incremented for each sample discarded because of the FIFO full condition. Thus, if FIFO 24 can hold four samples, any bus blockage beyond a four sample duration will result in a non-zero missing sample counter 62, with its value indicating the actual number of samples lost.

At such time as bus 11 becomes available again, DMA controller state machine 56 first transfers the samples held in FIFO 24 to main memory 16 starting with the address given by buffer current position 58. Then, the buffer current position 58 and interrupt counter 60 are further adjusted by the value of missing sample counter 62. After the adjustment, missing sample counter 62 is reset to zero. Thus, by keeping track and adjusting for the number of missed samples, DMA control state machine 56 can ensure that new data samples are stored in the right location and the interrupt period is not affected by the bus blockage. For the locations where data was lost due to the unavailability of bus 11, those locations can be either written with a predetermined amount which can either be an amount such as zero or it can be the amount written in the previous location that was valid. This can be determined as a matter of choice but in any event the location can be written with a predetermined amount and not just noise.

Similarly, for the sending portion 44, bus 11 provides data packets to FIFO 26 in response to read transactions initiated by DMA control state machine 76. The DMA control state machine 76 aims to keep FIFO 26 filled with data samples during normal operation. It monitors the FIFO 26's availability and issues bus read requests whenever FIFO 26 has sufficient space to hold a bus data packet that may contain up to four data samples. When bus 11 is blocked, FIFO 26 continues to provide samples to CODEC 30 until it is empty, then it outputs a predetermined value. The missing sample counter 82 is incremented for each sample request from CODEC 30 that arrives while FIFO 26 is empty. At such time as bus 11 does become available again, missing sample counter 82 holds the number of samples that have been substituted with the predetermined value. DMA control state machine 76 utilizes this information to adjust its buffer current position 78 and determine where in memory to retrieve the next samples. The missed sample count is also used to update the interrupt counter 80 so that the desired interrupt interval is not perturbed by the bus blockage. Missing sample counter 82 is then reset to zero after these adjustments to prepare for the next event.

The operation of sending portion 44 is thus very similar to receiving portion 42. The difference of significance is the direction of data flow but the principles are the same in both the operation of receiving portion 42 and sending portion 44. In both cases the DMA control state machines 56 and 76 choose the proper location for either storing or reading data based upon the number of data samples that have been missed due to bus 11 not being available and thus blocking the data path. Missing sample counters 62 and 82 provide this information. The DMA control state machines 56 and 76 also utilize the count information to maintain regular periodic interrupt timing despite the bus blockages.

An alternative solution to handling extended bus blockages is to implement large FIFOs, such as FIFOs 24 and 26, that can hold a sufficient number of data samples to span the blockages. In the case of sending portion 44, a large FIFO adds to the transmission delay between the time the data samples are generated and their actual output to the CODEC 30. For certain applications, such as speakerphone and echo-canceling data modem, a large sending FIFO introduces enough delay into the system to make it unusable. In any case, there is a significant saving in silicon area by not having a large FIFO while still able to read and write data samples to their proper locations. The data loss may or may not be significant depending upon the situation. In any event the data that is retained and provided is valid and may be used appropriately. The utility of a DMA controller such as 20 may extend to any situation in which it is important to retain data in its proper location and/or to avoid having to indicate that the connection has been lost due to the bus being unavailable.

What is claimed is:

1. A communications system, comprising:

a first-in, first-out (FIFO) buffer having a plurality of entries for temporarily storing a plurality of data signals received at an input at a predetermined sample rate, and the FIFO buffer having an output for providing the plurality of data signals, the FIFO being in a data transmission path;

a counter coupled to the FIFO buffer; and a direct memory access control state machine, coupled to the FIFO buffer and to the counter, for detecting when the data transmission path is blocked, and in response, enabling the counter to store a count value corresponding to a number of data samples that are blocked from being received by the FIFO buffer, wherein when data transmission resumes through the data transmission path, the stored count value is used to maintain a sampling time correlation of the plurality of data signals.

2. The communications system of claim 1, wherein the transmission path is for providing the plurality of data signals from an analog front-end of the communications system and the data transmission path blockage corresponds to the FIFO buffer being full.

3. The communications system of claim 1, wherein the transmission path is for providing the plurality of data signals from a data bus of the communications system and the data transmission path blockage corresponds to the FIFO buffer being empty.

4. The communications system of claim 1, wherein the FIFO buffer is a receive FIFO in a DSL (digital subscriber line) modem.

5. The communications system of claim 4, further comprising a coder/decoder circuit having a first input coupled to an analog front-end, a second input coupled to an output of a transmit FIFO buffer, a first output coupled to the input of the receive FIFO buffer, and a second output coupled to the analog front-end, wherein a first sample clock of the coder/decoder circuit is provided to a clock input of the receive FIFO buffer and to the counter, and wherein a second sample clock is provided to a clock input of the transmit FIFO buffer.

6. The communications system of claim 5, further comprising:

an interface circuit having an input coupled to the modem and an output coupled to the data bus; and a data processor, coupled to the data bus, for processing the plurality of data signals.

7. The communications system of claim 5, further comprising:

a current position register, coupled to the receive FIFO buffer, for storing a current position of a receive FIFO buffer pointer;

an interrupt counter coupled to the receive FIFO buffer;

a buffer start address register, coupled to the receive FIFO buffer, for storing a beginning of the plurality of entries; and a buffer end address register, coupled to the receive FIFO buffer, for storing an end of the plurality of entries.

8. A method for transmitting data through a data transmission path, comprising the steps of:

providing a plurality of data signals through a first-in, first-out (FIFO) buffer;

detecting that the data transmission path is blocked;

enabling a counter to store a count value corresponding to a number of data samples that are blocked from being received by the FIFO buffer;

receiving an indication that the data transmission path is no longer blocked; and resuming transmission through the data transmission path starting from a point determined using the stored count value;

wherein the stored count value is used to maintain a sampling time correlation of the plurality of data signals.

9. The method of claim 8, wherein the step of receiving an indication that the data transmission path is no longer blocked comprises receiving a bus grant to a communication bus in response to a direct memory access (DMA) request.

10. The method of claim 8, wherein the step of receiving an indication further comprises adjusting a current position pointer of the FIFO buffer using the stored count value to determine where to resume data transmission in the FIFO buffer.

11. The method of claim 8, wherein the data transmission path includes one of either a dial-up modem, a digital subscriber line (DSL) modem, or a speakerphone.

12. A communications system, comprising:

a communication bus;

a data processor, coupled to the communication bus, for processing data;

a receive first-in, first-out (FIFO) buffer coupled to transmit data from a location external to the communication system to the communication bus;

a transmit FIFO buffer coupled to transmit data from the communication bus to the location external to the communication system;

a direct memory access (DMA) controller, coupled to the communication bus and to the receive and transmit FIFO buffers, comprising:

a receive counter for storing a first count value corresponding to a number of data samples that are blocked from being transmitted by the FIFO buffer to the communication bus when the communication bus is blocked;

a receive FIFO buffer pointer, coupled to the receive counter, for storing a first pointer value that is determined using the first count value, the first pointer value for indicating a starting entry of the receive FIFO buffer when data transmission is resumed;

a transmit counter for storing a second count value corresponding to a number of data samples that are blocked from being transmitted to the FIFO buffer from the communication bus when the communication bus is blocked; and a transmit FIFO buffer pointer coupled to the transmit counter for storing a second pointer value that is determined using the second count value, the second pointer value for indicating a starting entry of the transmit FIFO buffer when data transmission is resumed.

13. The communications system of claim 12, further comprising:

a coder/decoder circuit coupled to the receive and transmit FIFO buffers; and an analog front-end circuit, coupled to the coder/decoder circuit and to a transmission media.

14. The communications system of claim 12, wherein the DMA controller further comprises a state machine for monitoring and detecting when the communication bus is blocked and for starting one of the first or second counter.

15. The communications system of claim 12, wherein the receive FIFO buffer, the transmit FIFO buffer, and the DMA controller are part of one of a DSL modem, dial-up modem, or a speakerphone.

16. The communications system of claim 12, wherein data transmission through one of the receive and transmit FIFO buffers is resumed in response to a communication bus grant in response to a DMA request.

17. The communications system of claim 12, further comprising:

a first current position register, coupled to the receive FIFO buffer, for storing a first current position of a receive FIFO buffer pointer;

a first interrupt counter coupled to the receive FIFO buffer;

a first buffer start address register, coupled to the receive FIFO buffer, for storing a beginning of a first plurality of entries; and a first buffer end address register, coupled to the receive FIFO buffer, for storing an end of the first plurality of entries.

18. The communications system of claim 17, further comprising:

a second current position register, coupled to the transmit FIFO buffer, for storing a second current position of a transmit FIFO buffer pointer;

a second interrupt counter coupled to the transmit FIFO buffer;

a second buffer start address register, coupled to the transmit FIFO buffer, for storing a beginning of a second plurality of entries; and a second buffer end address register, coupled to the transmit FIFO buffer, for storing an end of the second plurality of entries.

* * * * *